United States Patent [19]
Jaramillo

[11] Patent Number: 6,088,751
[45] Date of Patent: Jul. 11, 2000

[54] HIGHLY CONFIGURABLE BUS PRIORITY ARBITRATION SYSTEM

[75] Inventor: Kenneth Jaramillo, Phoenix, Ariz.

[73] Assignee: VLSI Technology, Inc., San Jose, Calif.

[21] Appl. No.: 09/023,053

[22] Filed: Feb. 12, 1998

[51] Int. Cl.[7] .................................................. G06K 13/00
[52] U.S. Cl. ............................................................ 710/116
[58] Field of Search ................................... 710/116, 123, 710/110, 107, 113

[56] References Cited

U.S. PATENT DOCUMENTS

| 5,241,632 | 8/1993 | O'Connell et al. ................ 710/117 |
| 5,560,016 | 9/1996 | Fiebrich et al. ................... 710/240 |
| 5,857,083 | 1/1999 | Venkat ............................... 395/309 |
| 5,872,936 | 2/1999 | Eckstein ............................ 710/107 |
| 5,884,051 | 3/1999 | Schaffer et al. .................. 710/107 |
| 5,901,332 | 5/1999 | Gephardt et al. ................... 710/41 |
| 5,941,979 | 8/1999 | Lentz et al. ........................ 712/33 |
| 5,963,560 | 10/1999 | Kalkunte ......................... 370/448 |

*Primary Examiner*—Ayaz R. Sheiki
*Assistant Examiner*—David A. Wiley
*Attorney, Agent, or Firm*—Wagner Murabito & Hao LLP

[57] ABSTRACT

The present invention comprises a computer system with a reconfigurable bus priority arbitration system. The computer system of the present invention includes a master device, a slave device, an arbiter and a reconfigurable bus priority arbitration system, all coupled to a bus. The reconfigurable arbitration system determines said master device's relative priority for bus accesses and is capable of implementing a plurality of linked arbitration priority schemes.

17 Claims, 15 Drawing Sheets

TABLE 4A

ATTEMPTS AT PCI BUS ACCESS

| DEVICE | 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| 0A | 0 | X | L | L | L | X | L | X | L | X | L | X | L | X | L | X | L | X |
| 1A | 0 | 0 | X | L | L | 0 | X | L | L | 0 | X | L | L | 0 | X | L | L | 0 |
| 2A | 0 | 0 | 0 | 0 | X | L | L | L | L | 0 | 0 | 0 | X | L | L | L | L | 0 |
| 3A | 0 | 0 | 0 | 0 | 0 | 0 | 0 | 0 | X | L | L | L | L | L | L | L | L | 0 |
| 4A | 0 | 0 | 0 | 0 | 0 | 0 | 0 | 0 | 0 | 0 | 0 | 0 | 0 | 0 | 0 | 0 | X | 0 |
| B | 0 | 0 | 0 | 0 | 0 | 0 | 0 | 0 | 0 | 0 | 0 | 0 | 0 | 0 | 0 | 0 | 0 | 0 |

FIG. 4A

HIGHLY CONFIGURABLE BUS PRIORITY ARBITRATION SYSTEM

TECHNICAL FIELD

The present invention relates to the field of computer system bus arbitration. More particularly, the present invention relates to a highly configurable bus priority arbitration system that permits the design of a flexible arbiter capable of implementing a variety of arbitration priority schemes in multiple computer systems or applications.

BACKGROUND ART

The bus architecture of a computer system substantially influences the manner in which information is communicated between the components of a computer system. In a typical computer system, one or more busses are used to connect a central processing unit (CPU) to a memory and to input/output elements. Typically the bus consists of several "lines" of electrically conductive material. The bus permits electrical signals representing data and control instructions to be readily transmitted between different components coupled to the bus. The order and speed at which the components interact with each other over the bus has a substantial impact on the performance of the computer system.

In order to maximize the benefit of computer systems, the electronics industry has engaged in activities to develop several types of progressively faster bus architectures. Recently, the PCI (peripheral component interconnect) bus architecture was developed to provide a high speed, low latency bus architecture from which a large variety of computer systems could be developed. The PCI bus architecture has become one of the most widely used and supported bus architectures in the industry.

Prior Art FIG. 1 shows a typical PCI bus architecture 100. PCI bus architecture 100 is comprised of a CPU 102 and a main memory 104, both coupled to a host PCI bridge arbiter 106 (hereafter PCI arbiter 106). CPU 102 is coupled to PCI arbiter 106 through a CPU local bus 108. Main memory 104 is coupled to PCI arbiter 106 by memory bus 110. The PCI bus 112 is coupled to arbiter 106 and to each of the PCI compliant devices or "agents" 114, 116, 118, 120, 122, and 124 respectively. Each of the PCI agents 114, 116, 118, 120, 122, and 124 (hereafter referred to collectively as PCI agents 114–124) residing on PCI bus 112 use PCI bus 112 to transmit and receive information and signals. PCI bus 112 is comprised of functional signal lines and data lines; for example, interface control lines, address/data lines, error signal lines, and the like. PCI agents 114–124 follow a definitive set of protocols and rules designed to standardize the method of accessing, utilizing, and relinquishing PCI bus 112. The PCI bus protocols and specifications are set forth in an industry standard PCI specification (e.g., PCI Specification—Revision 2.1).

In accordance with the industry standard PCI specification, only one data transaction can take place on a PCI bus at any given time. To ensure this requirement is enforced, the typical PCI bus system has a PCI arbiter that controls access to the PCI bus. When one of the PCI agents 114–124 requires the use of PCI bus 112 to transmit or receive data, the PCI agent requests PCI bus 112 "ownership" from PCI arbiter 106. The PCI agent requesting ownership is referred to as a PCI initiator agent, or master device. The term master device is generically used in bus systems, including systems other than PCI. The PCI agent the PCI initiator agent is attempting to communicate with is referred to as a PCI target agent (e.g., main memory 104) or slave device. The term slave device is generically used in bus systems, including bus systems other than PCI. Typically, each of the PCI agents 114–124 may independently act as a PCI initiator agent and request the PCI bus ownership. Thus, at any given time several of the PCI agents 114–124 may be requesting the PCI bus ownership simultaneously. Where there are simultaneous requests for PCI bus ownership, PCI arbiter 106 arbitrates between requesting PCI initiator agents to determine which requesting PCI initiator agent will be granted PCI bus ownership.

Each device needs ownership of the PCI bus in accordance with its respective requirements. These requirements include, for example, latency tolerance, data transfer bandwidth, block transfer size, and the like. Each device should have a differing priority status with regard to their respective requests for PCI bus ownership. Some devices are more critical to the proper operation of the computer system than others, some devices are less tolerant of latency than others, and some devices need to transfer very large quantities of data. If the arbiter grants PCI bus access in an erratic or arbitrary manner there is no assurance that the computer system will operate effectively. However, if devices with more critical requirements are assured a better chance of obtaining bus access, the computer system will operate more efficiently. Thus, the order in which master devices access a bus is very important and often critical to the optimal operation of the computer system. Typically, the order in which devices access a bus is set forth in an arbitration priority scheme FIG. 2 shows a typical prior art fixed priority arbitration scheme 200. Fixed priority arbitration scheme 200 shows the relative priority of 7 coupled devices, device 0 through device 6, where device 0 is the highest priority device and device 6 is the lowest priority PCI agent. For example, a network adapter card typically has a requirement that it transfer very large blocks of data from the network to main memory, which requires a disproportionately large amount of PCI bus data transfer bandwidth. The network adapter also typically has internal buffers of limited size, which cannot tolerate data transfer latency without incurring a buffer overrun or underrun. Consequently, the network adapter would typically be coupled as device 0. In contrast, typically a printer does not have a requirement to transfer particularly large blocks of data, is typically very tolerant of latency, and thus would typically be coupled as device 6. Thus, devices with rigorous requirements are allocated higher priority in arbitration priority scheme 200 (e.g., device 0) while devices with relatively less rigorous requirements are allocated lower priority (e.g., device 6).

Despite the potential benefits of the above priority arbitration system, it has several flaws. When any other device requests bus ownership simultaneously with device 0, the other device is always denied bus access and device 0 always receives ownership first. Lower priority devices may not be granted sufficient access to the bus because they can be prevented from acquiring ownership for long periods of time. That is, lower priority devices may be "starved" of PCI bus bandwidth, especially in computer systems where there are many high bandwidth devices. Hence, arbitration priority scheme 200 does not ensure low priority devices will be granted adequate PCI bus access.

Resolving problems associated with arbitration systems is typically very difficult and entails the expenditure of significant engineering resources. For example, an apparent simple resolution to the "starvation" problem would be to give all the devices an equal opportunity to access the bus.

However, as indicated above, devices typically have differing requirements. As a result, simply assigning each device the same priority typically means PCI bus access time is not being assigned in a manner that permits the computer system to operate optimally. If adequate attention is not given to the arbitration priority scheme the computer system may not work at all. Consistently sustaining the high transaction (e.g. data transfer) rates across a PCI bus typically demanded by a computer system requires efficient allocation of PCI bus ownership.

Efficiently managing the priority allocation of the PCI bus is essential to the proper operation of a computer system. As described above, only one device at a time can transfer data across the PCI bus, and the PCI arbiter determines which device is granted PCI bus access. When the PCI arbiter receives competing requests for bus ownership, the PCI arbiter assigns access to the PCI bus based on the relative priority of the devices. Typically, some devices are more important to the functionality of the computer system than other devices and are thus considered a higher priority. The arbiter needs to ensure that PCI bus access is allocated among the competing devices based upon the relative priority of the devices' requirements. To accomplish this, the arbiter typically follows a predetermined arbitration priority scheme (or arbitration methodology) based on the devices in the computer system and their respective requirements.

Given the arbitration priority scheme is typically based on the respective requirements of devices in the computer system, the most efficient arbitration priority scheme is not ascertainable until after the devices of a particular computer system are designed and their requirements ascertained. Previously, an optimal design for the PCI arbiter could not be designed until after the PCI initiator agents and PCI target agents of a particular computer system were designed. Thus, engineering resources committed to the arbiter design are essentially "on hold" until after the rest of the computer system is designed. In addition, waiting to design the arbiter means that there are significant delays in production of the final product and in realization of the advantages associated with new computer system designs.

Other current technology limitations adversely affect arbitration design and implementation. As indicated above, it is possible for the requirements of PCI initiator agents and PCI target agents to vary greatly. Since an arbiter's priority allocation is based upon the specific requirements of the devices in a particular computer system, it is unlikely the PCI arbiter for a particular computer system contains the most efficient arbitration priority scheme for a different computer system. Thus, existing arbiters effectively have to be thrown out when a new computer system is designed. That is, new arbiters have to be designed and manufacturing processes reengineered for each new computer system. The present state of arbiter technology is lacking some significant desirable attributes.

What is required is a single reconfigurable priority arbitration system with flexible reprogrammable arbitration priority schemes. The required priority arbitration system should efficiently allocate PCI bus bandwidth to optimize the overall functionality of the computer system. The priority arbitration system should be capable of adjusting to changes in device requirements and addressing complex priority allocation parameters. The required solution needs to ensure devices with stringent requirements that demand significant PCI bus bandwidth are assigned a relatively high priority and properly served, while providing low priority devices with sufficient bus access time to guarantee they are not "starved". The present invention provides a novel solution to the above requirements.

SUMMARY OF THE INVENTION

The present invention is a method and system of bus arbitration that provides for a reconfigurable priority arbitration system with flexible reprogrammable arbitration priority schemes. The present invention efficiently allocates PCI bus bandwidth to optimize the overall functionality of a computer system. The reconfigurable priority arbitration system is capable of adapting to changes in device requirements and addressing complex priority allocation parameters. The present invention provides methods of ensuring devices with stringent requirements that demand significant PCI bus bandwidth are assigned a relatively high priority and properly served, while providing low priority devices with sufficient bus access time to guarantee they are not "starved". The present invention provides a programmable and highly reconfigurable priority arbitration system that permits implementation of multiple arbitration priority schemes in a variety of computer systems.

In one embodiment, the invention comprises a flexible reconfigurable priority arbitration system implemented in a PCI (peripheral component interconnect) system. The reconfigurable priority arbitration system is configured by programming devices coupled to the PCI system to correspond to priority position holders in multiple linked arbitration priority scheme levels. One of the arbitration priority scheme levels implements a predictable latency guaranteed access fixed priority arbitration scheme. The arbiter grants PCI bus access to the device assigned to a priority position holder level that is next in line in the predictable latency guaranteed access fixed priority arbitration scheme. After receiving PCI bus access the device is transferred to an interim low priority state, which it stays in until a device with a lower original priority state has been granted PCI bus access. In so doing, the present invention ensures the ability to adjust a priority arbitration system. The present invention also ensures the PCI bus bandwidth is efficiently allocated to optimize the overall functionality of a computer system. In so doing, the present invention ensures that devices with stringent requirements that demand significant PCI bus bandwidth are assigned a relatively high priority and properly served, while providing low priority devices with sufficient bus access time to guarantee they are not "starved".

In another embodiment, the present invention comprises a flexible reconfigurable priority arbitration system. The flexible reconfigurable priority arbitration system of the present invention includes a master device, a slave device, an arbiter, and a reconfigurable priority arbitration system, all coupled to a bus. The reconfigurable priority arbitration system determines a master device's relative priority bus access and is capable of implementing a plurality of linked arbitration priority schemes. In this embodiment the devices are assigned a priority position holder in an arbitration priority scheme. In so doing, the present invention ensures that the priority arbitration system is capable of adjusting to changes in device requirements and addressing complex priority allocation parameters.

BRIEF DESCRIPTION OF THE DRAWINGS

The accompanying drawings which are incorporated in and form a part of this specification, illustrate embodiments of the invention and together with the description, serve to explain the principles of the invention:

FIG. 4A shows table 4A, illustrating a sequence of resulting bus grants and interim low priority states of a predictable latency guaranteed access fixed priority arbitration scheme 400 associated with one embodiment of the present invention.

BEST MODE FOR CARRYING OUT THE INVENTION

Figure 1:
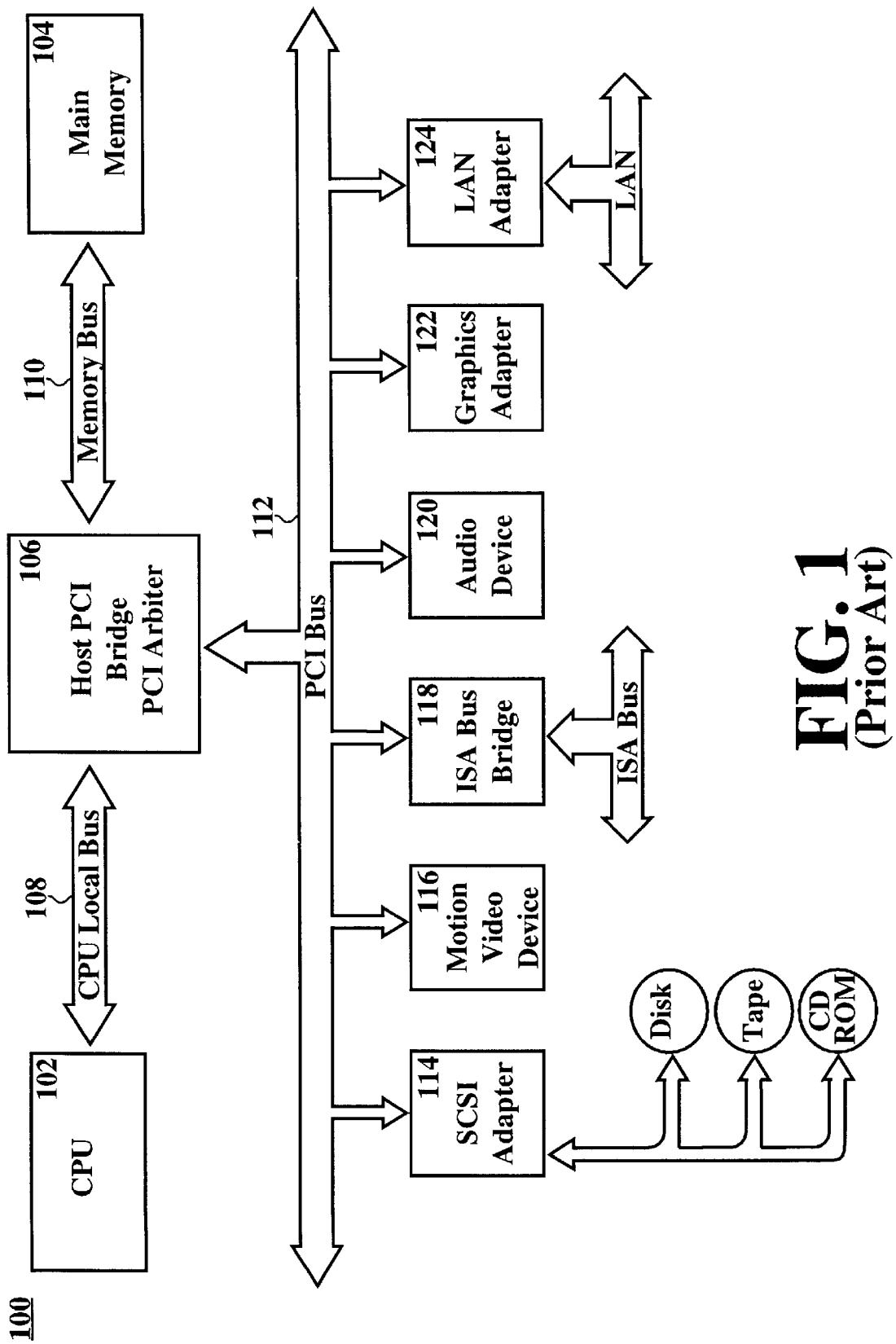
FIG. 1 shows a typical PCI bus architecture of the prior art.
Figure 2:
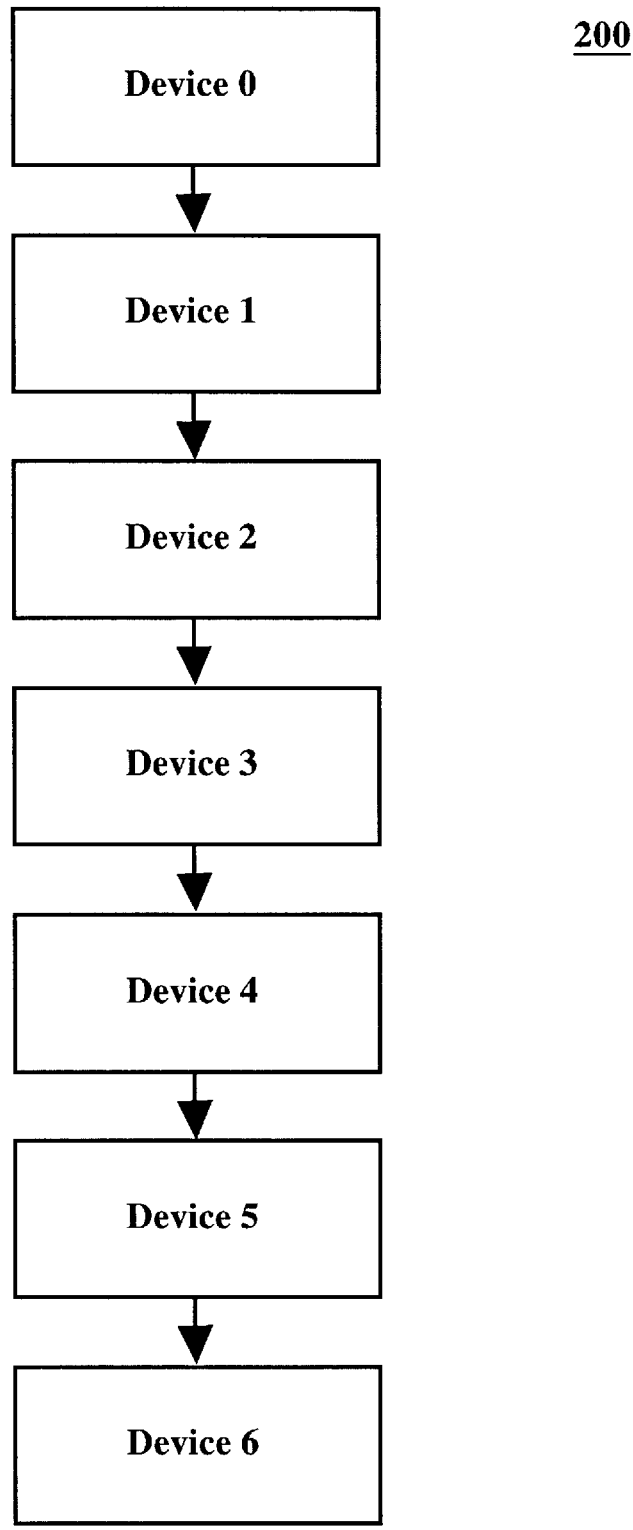
FIG. 2 is a diagram of a typical prior art fixed priority arbitration scheme.

Reference will now be made in detail to the preferred embodiments of the present invention, a highly reconfigurable priority arbitration system. Examples of the preferred embodiments are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one ordinarily skilled in the art that the present invention may be practiced without these specific details. In other instances, well known methods, procedures, components, and circuits have not been described in detail as not to unnecessarily obscure aspects of the current invention.

The highly reconfigurable priority arbitration system of the current invention allows for more effective utilization of bus time when a master device attempts a data transaction with a slave device. The reconfigurable priority arbitration system of the present invention significantly increases bus data transfer bandwidth available to other devices. In addition, the present invention provides a significant level of bus access flexibility and sensitivity, capable of accommodating the relative requirements of devices within a variety of computer systems. The present invention and its benefits are discussed in greater detail below.

One embodiment of the present invention involves a computer system wherein the devices in the computer system are coupled to a PCI bus and communicate with each other via the PCI bus. The requirements of the devices determine their relative priority for being granted access to the PCI bus. Typically high priority devices are those devices which require large amounts of data transfer bandwidth or are intolerant of latency. Such devices typically include, for example, network adapter cards, graphics accelerator cards, real time video devices, and the like. Typically, low priority devices include, for example, telephone modems, audio cards, printers, and the like, which can function nominally under moderate latency. The priority each device has to PCI bus access is established and governed by the present invention.

The present embodiment involves a highly reconfigurable PCI bus priority arbitration system that permits a flexible application of multiple bus arbitration priority schemes. The flexibility of the present invention is primarily accomplished by a system of programmable priority position holders in an arbitration priority scheme. Each priority position holder is programmed to correspond to one of the devices of the computer system. When the reconfigurable priority arbitration system indicates a priority position holder is next in line, the corresponding device is granted PCI bus access (if the corresponding device has requested PCI bus access).

Priority position holders can be further divided into linked levels of varying arbitration priority schemes. Priority position holders comprising a level are available for assignment to a device. The actual devices supported by a particular level are chosen by programming the reconfigurable priority arbitration system so that the device corresponds to or is assigned a priority position holder in the particular level. If all of the priority position holders in a level are not required to support devices, the arbitration priority scheme of that level will "shrink" to fit only the supported devices.

Figure 3:
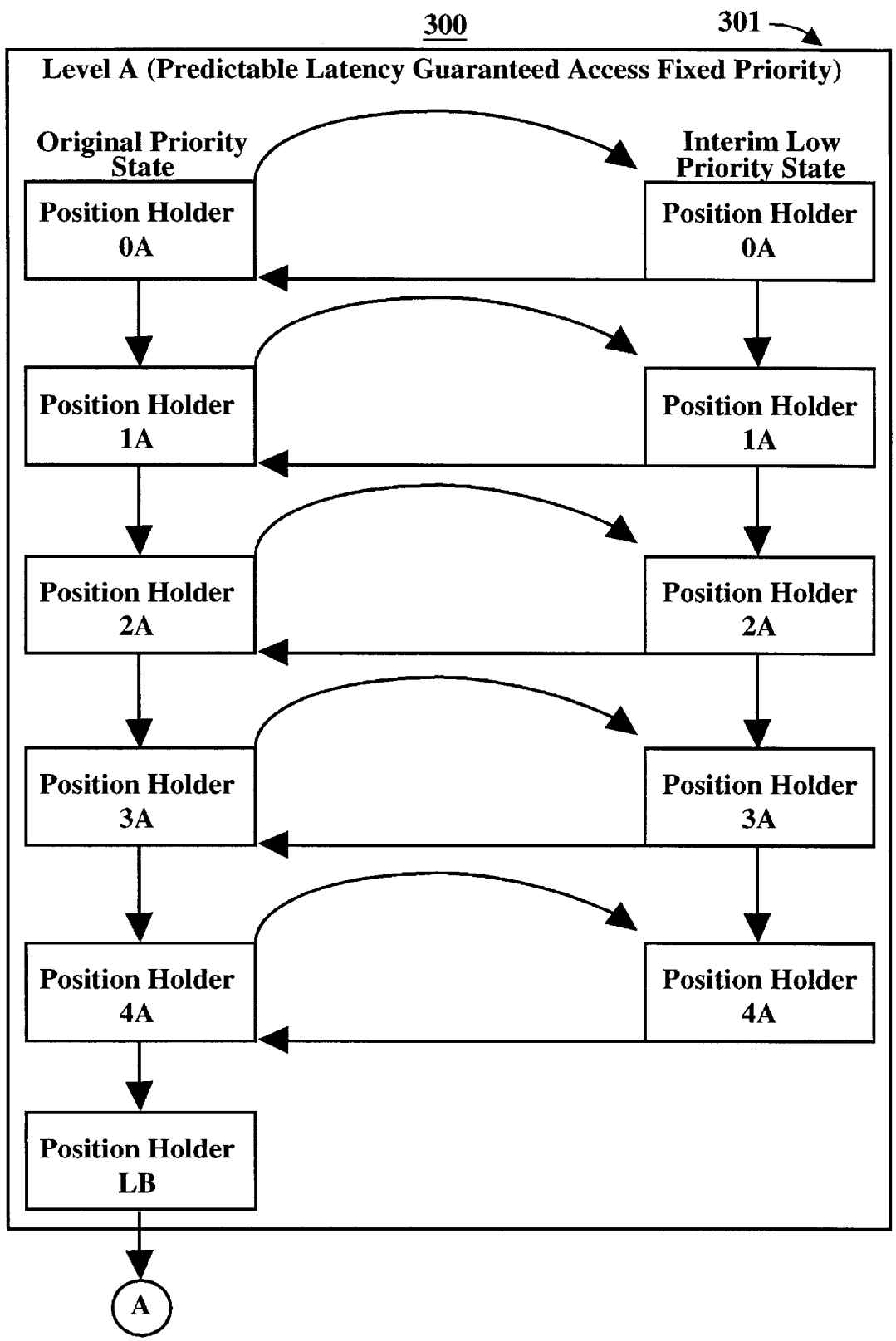
FIG. 3 is a diagram of a mulitlayer flexible arbitration priority scheme comprising linked levels of various arbitration priority schemes in accordance with one embodiment of the present invention.
Figure 3:
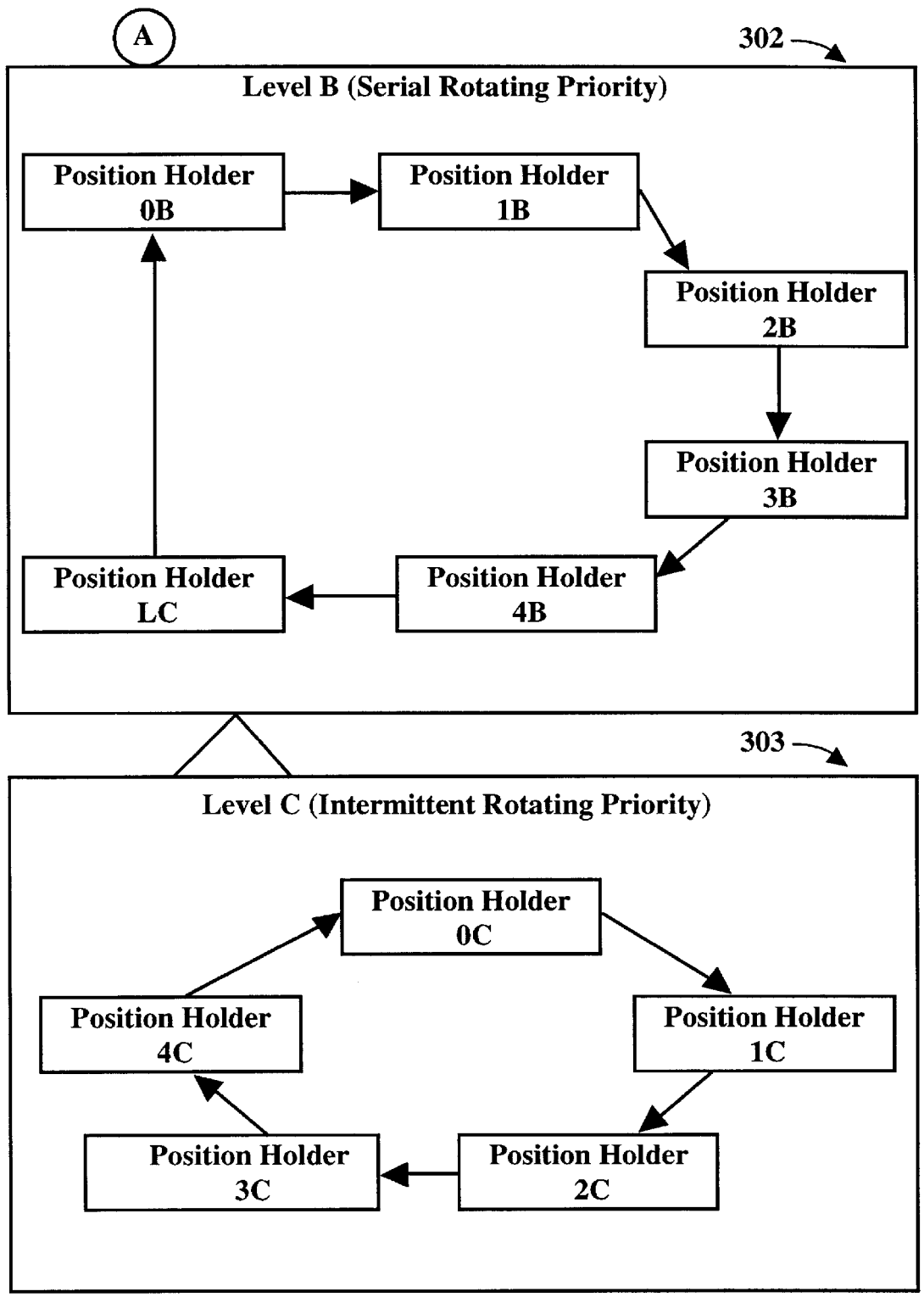

FIG. 3 shows one embodiment of linked arbitration priority schemes. Each arbitration priority scheme is assigned to a level, depicted in FIG. 3 as level A 301, level B 302 and level C 303. In the present embodiment level A 301 is the highest arbitration priority scheme, level B 302 is the next highest arbitration priority scheme and level C 303 is the lowest arbitration priority scheme. Within each of these linked levels of arbitration priority schemes there is a plurality of priority position holders assigned to devices within a computer system.

In the present embodiment, level A 301 is a predictable latency guaranteed access fixed priority arbitration scheme. A predictable latency guaranteed access fixed priority arbitration scheme has a plurality of priority position holders. The present predictable latency guaranteed access fixed priority arbitration scheme of level A 301 shows the relative priority of 6 priority position holders, priority position holder 0A through priority position holder LB (hereinafter 0A–LB). The predictable latency guaranteed access fixed priority arbitration scheme of level A 301 shows priority position holders 0A–LB in their original priority states (on the left side) and priority position holders 0A–4A in their interim low priority states (on the right side). Priority position holders 0A–LB are arranged in order of priority such that priority position holder 0A in its original priority state is the highest priority position holder in the reconfigurable priority arbitration system of the present embodiment. The next highest priority position holder is priority position holder 1A in its original state, and so on, through the lowest priority position holder of level A (e.g. priority position holder LB). Priority position holder LB is not assigned to a particular device. Priority position holder LB serves as the junction to level B 302 and is assigned to the "winner" of level B arbitration.

The predictable latency guaranteed access fixed priority arbitration scheme of level A 301 permits efficient allocation of PCI bus bandwidth (e.g., PCI bus ownership) among devices assigned to priority position holders 0A through the junction to level B 302 in accordance with the respective requirements of the devices. The level A 301 predictable latency guaranteed access fixed priority arbitration scheme satisfies the bandwidth and latency requirements of the devices assigned to high priority position holders while concurrently ensuring the devices assigned to lower priority position holders are not starved. Each of the priority position holders 0A through LB have an original priority state. However, priority position holders 0A through 4A also have an interim low priority state. In accordance with the predictable latency guaranteed access fixed priority arbitration scheme, a two state attribute permits grants of the PCI bus to be "perceptible", in that successive grants to a high priority position holder affect subsequent grants to that high priority position holder.

As mentioned above, subsequent grants are affected through the use of interim priority states. Where a high priority PCI agent (a device assigned to priority position holder 0A) requests and is granted the PCI bus, it becomes a priority position holder in an interim low priority state for the next arbitration. This interim low priority state is treated by an arbiter as the lowest priority of the priority position holders 0A–LB. A priority position holder in an interim low priority state remains the lowest priority position holder until a device assigned to a priority position holder in a lower original priority state (e.g., priority position holder 1A) is granted the bus. The priority position holder in the interim low priority state then reverts to its original priority state. Priority position holder LB does not have an interim low priority state because it is already the lowest priority position holder in level A 301 predictable latency guaranteed access fixed priority arbitration scheme. When the predictable latency guaranteed access fixed priority arbitration scheme level A 301 gets to priority position holder LB, priority is then determined in accordance with level B's arbitration priority scheme.

In the present embodiment level B 302 is a serial rotating priority arbitration scheme. In the serial rotating priority arbitration scheme of level B 302 there are 6 priority position holders, 0B through LC. The serial rotating priority arbitration scheme requires that a particular position holder act as a beginning and ending point. In the present embodiment, the beginning position holder is position holder 0B and gets priority first when level A 301 turns over priority to level B 302. Level B 302 serial rotating priority arbitration scheme involves a round robin type approach and provides for each position holder to have equal opportunity to access the PCI bus on a rotating basis. Even though the priority rotates as soon as the current PCI bus initiator begins its cycle, the actual bus grant outputs from the arbiter do not select the next bus initiator until the current bus initiator completes its PCI cycle. For example, in the present embodiment, after the device corresponding to position holder 0B has been granted PCI bus access, the device corresponding to position holder 1B is granted PCI bus access, after the device corresponding to position holder 1B is granted PCI bus access, the device corresponding to position holder 2B is granted PCI bus access, etc., until the last device in Level B 302 has had an opportunity to access the PCI bus. When the serial rotating priority arbitration scheme in level B 302 gets to priority position holder LC, priority is then determined in accordance with the arbitration priority scheme of level C 303.

Level C 303 has an intermittent rotational arbitration priority scheme. In level C's 303 arbitration priority scheme, the highest priority position holder in level C 303 is granted access first (e.g. position holder 0C). After the device assigned to a priority position holder has finished its transaction the priority is switched back to level B 302. The bus allocation then complies with level B's arbitration priority scheme, which in the present embodiment means the priority is switched back to level A. After the priority allocation works its way through level A and level B and gets back to the lowest position holder in level B 302, that is, priority position holder LC corresponding to a position holder in Level C 303, the next priority position holder in level C 303 is granted PCI bus access (i.e. position holder 1C). The PCI bus access continuously gets assigned in accordance with the above reconfigurable priority arbitration system.

Figure 4:
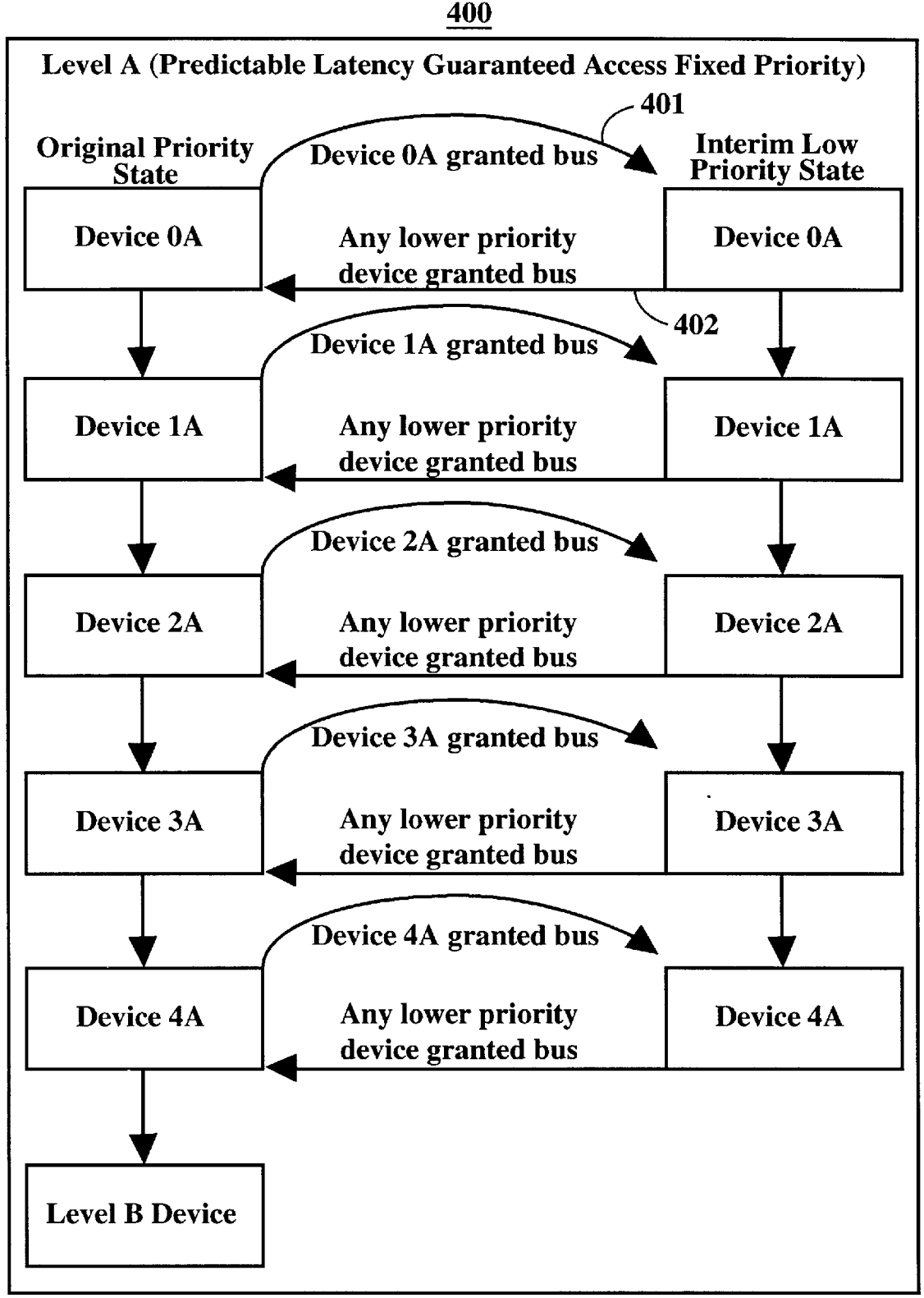
FIG. 4 is a diagram of a low level guaranteed access fixed arbitration priority scheme with devices assigned to priority position holders schemes in accordance with one embodiment of the present invention.

FIG. 4 shows an example of a predictable latency guaranteed access fixed priority arbitration scheme 400 after devices 0A, 1A, 2A, 3A, 4A and Level B (LB) have been assigned to the priority position holders. Level B (LB) is not a device, the device that actually occupies priority position holder LB at any given time is effectively determined by the arbitration scheme of level B rather than any specific single device assignment. As indicated above, priority position holder LB does not have an interim low priority state and thus when a device occupying priority position holder LB is granted the bus it effectively returns to its rotation in level B's priority scheme. The device that is next in line in level B's priority scheme is then assigned to priority position holder LB until it is granted the bus.

Device 0A in its original priority state occupies a high priority position in the predictable latency guaranteed access fixed priority arbitration scheme 400 and will "win" any arbitration with another priority device (e.g., device 1A). Upon being granted the PCI bus, device 0A becomes an interim low priority PCI agent. This is shown by arrow 401. At this time, device 0A has the lowest "effective" priority of devices 0A–LB. For any subsequent arbitration, any of devices 1A–LB (e.g., in the original priority column) will win PCI bus ownership as against device 0A by virtue of device 0A's interim low priority status. That is, even devices assigned to Level B have a higher priority than devices 0A–4A when devices 0A–4A are in the interim low priority state. In the present embodiment, devices in the interim low priority state have a priority which is the reverse of devices in the original priority state. That is, for devices in the interim low priority state device 4A would have a higher priority than device 3A, device 3A would have a higher priority than device 2A, device 2A would have a higher priority that device 1A and so on.

While in the interim low priority state, device 0A cannot be granted PCI bus ownership unless there are no other original priority devices requesting ownership. Once any of device having a lower original priority than device 0A is granted PCI bus ownership, device 0A reverts back to its original priority (e.g., the original priority column). This is shown by arrow 402. Upon reversion to its original priority, device 0A once again wins any arbitration with any of devices 1A–LB.

This process of occupying an interim low priority position after being granted the PCI bus applies when any of devices 0A–4A is granted the PCI bus. The device granted the PCI bus is given an interim low priority having the lowest effective priority as against all other original priority devices in the predictable latency guaranteed access fixed priority arbitration scheme 400. A device given interim low priority cannot be granted the PCI bus unless there are no other lower priority devices (according to the original priority column) requesting ownership.

As mentioned above, when two devices are in the interim low priority state, they are assigned a priority the reverse of their original priority. For example, if device 2A and device 3A are in their interim low priority state, they have a lower effective priority than all devices in the original priority state. However, the "effective" interim priority of device 3A is now higher than that of device 2A. Device 2A does not regain its priority over 3A until device 2A returns to its original priority position holder. It should be appreciated that in the present embodiment, the devices assigned to level B 302 remain in an original priority state with respect to the arbitration priority scheme in level A 301, because the devices in level B 302 already lose any arbitration with any of devices 0A–4A in their original priority state. However, devices assigned to level B 302 are guaranteed access to the PCI bus due to the fact that as each of devices 0A–4A is granted ownership, they become interim low priority devices. Hence, when all of devices 0A–4A are in the interim low priority state, level B devices will have a higher priority than devices 0A–4A. Therefore, eventually, the devices in level B 302 will win an arbitration for PCI bus access.

In this manner, the predictable latency guaranteed access fixed priority arbitration scheme 400 ensures the lower priority devices are not starved of data transfer bandwidth. The interim low priority states of the predictable latency guaranteed access fixed priority arbitration scheme 400 avoid the PCI bus monopolization problems encountered in prior art PCI bus arbitration processes. The predictable latency guaranteed access fixed priority arbitration process 400 has no potential PCI agent starvation conditions due to the fact that it gives each device 0A–4A and the level B device a chance to obtain PCI bus ownership while simultaneously satisfying the greater PCI bus access requirements of higher priority devices. In addition, a predictable latency guaranteed access fixed priority arbitration scheme offers better latency performance for the most latency sensitive devices (e.g., device 0A).

FIG. 4A shows table 4A, illustrating a sequence of resulting bus grants and interim low priority states of a predictable latency guaranteed access fixed priority arbitration scheme 400 associated with the present embodiment. The table comprises rows and columns of cells, in which a row is assigned to each device and the columns represent attempts by the devices to access the PCI bus. In order not to unnecessarily obscure the invention Table 4A only addresses instances worst case conditions (e.g., when all devices are simultaneously requesting PCI bus ownership).

The cells of table 4A contain a X, 0 or L, indicating a whether a device is granted PCI bus access or not and if it is in an interim low priority state. If a cell contains an X the corresponding device is granted PCI bus access. If a cell contains an L, the corresponding device is in an interim low priority state and is not granted PCI bus access (because in this embodiment, there is always a device in the original priority state arbitrating for PCI bus access). If a cell contains a 0 the associated device is not granted PCI bus access and remains in its original priority state. By counting the number of X's across each row and comparing it to the number of 0's and L's, it is evident that predictable latency guaranteed access fixed priority arbitration scheme 400 grants ownership to device 0A ½ of the time, device 1A ¼ of the time, device 2A ⅛ of the time, device 3A 1/16 of the time, device 4A 1/32 of the time, and level B 1/64 of the time, etc.

Hence, although the low priority devices may suffer from long bus latency during heavy loading periods, they are not shut out from PCI bus access. If the low priority devices are not especially sensitive to latency, heavy loading periods are not an issue with the predictable latency guaranteed access fixed priority arbitration scheme 400. If all devices (e.g., including low priority devices) are sensitive to latency, then the predictable latency guaranteed access fixed priority arbitration scheme 400 can be modified to rotate the original priority of devices 0A–LB to periodically redistribute allocation.

Figure 5:
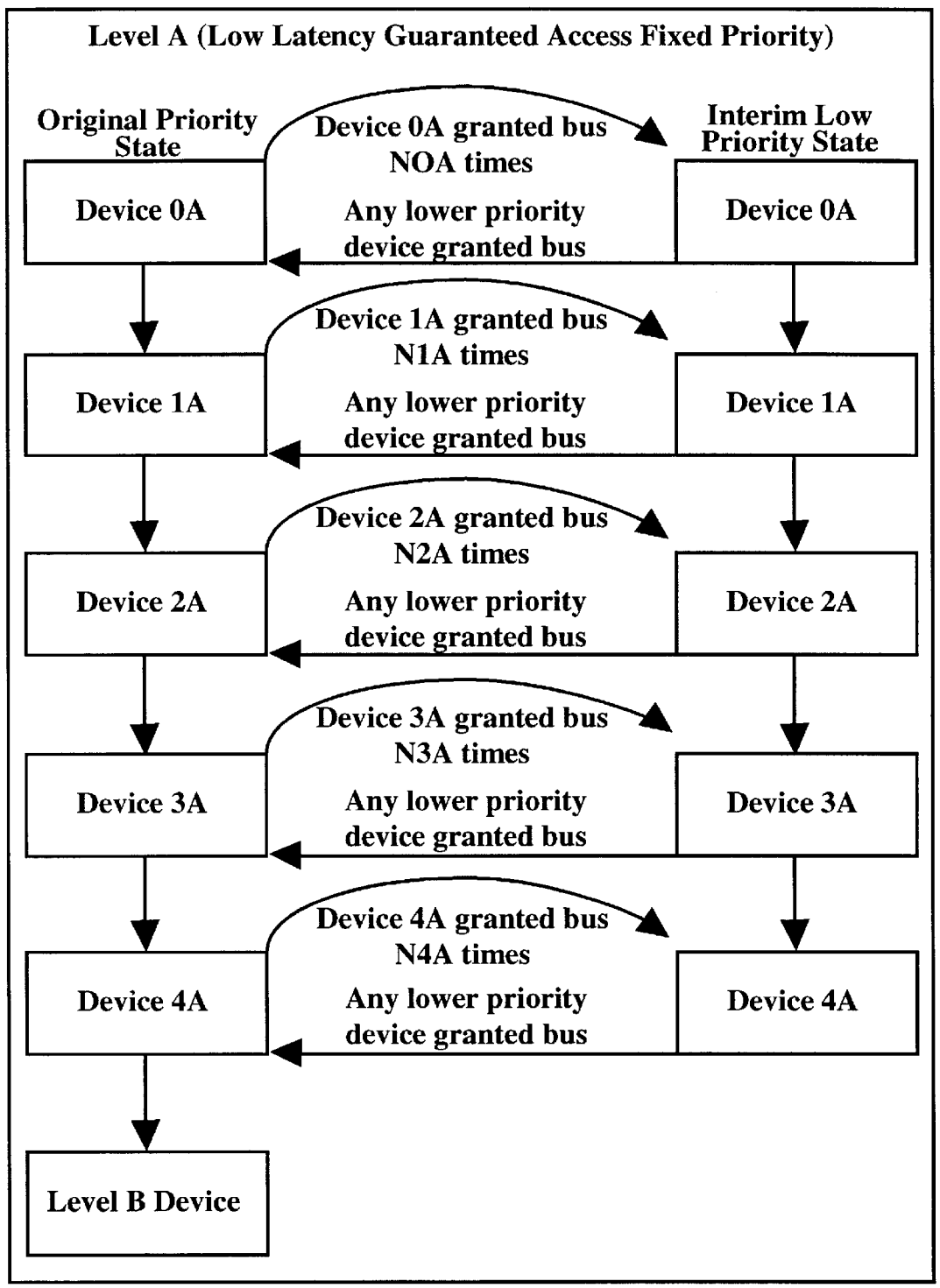
FIG. 5 is a diagram of a low level guaranteed access fixed arbitration priority scheme with a variable of the original state time period schemes in accordance with one embodiment of the present invention.

The present embodiment of a predictable latency guaranteed access fixed priority arbitration scheme offers additional flexibility when it is modified in conformance with the predictable latency guaranteed access fixed priority arbitration scheme 500, as shown in FIG. 5. The predictable latency guaranteed access fixed priority arbitration scheme 500 provides a more granular, finer resolution of PCI bus bandwidth allocation and this allocation is programmable. With the predictable latency guaranteed access fixed priority arbitration scheme 400, as described above, device 0A receives ownership 50% of the time, device 1A 25% of the time, and so on, depending upon each device's original priority. In contrast, the predictable latency guaranteed access fixed priority arbitration scheme 500 allows adjustable amounts of bandwidth allocation for each device by using an interim variable ownership allocation factors for each priority position holder (e.g. N0A through N4A) in addition to each device's original priority.

The interim variable allocation factors impact PCI bus access by modifying the time the devices stay in their original priority state before switching to their interim low priority state. For example device 0A, rather than converting to the interim low priority state after a single access, waits for a variable N accesses before converting to the interim low priority state (See FIG. 5). The variable N is a predetermined or programmable number of accesses. This predetermined or programmable number corresponds to the allocation factor N0A. By programming N0A, a customized ownership allocation is obtained. An arbiter in accordance with the present embodiment will allow this number of accesses to occur before treating device 0A as an interim low priority device. As with arbitration process 400, device 0A, (as with any devices 1A–4A) once in the interim low priority state, has the lowest effective priority of any of devices 1A–LB. Once a lower priority device is granted ownership (e.g., any of devices 1A–LB), device 0A reverts back to its original priority. In this manner, programmable, high resolution PCI bus allocation is obtained.

Another, embodiment ties an allocation factor to PCI bus cycles instead of PCI bus accesses. For, example when one of devices 0A–4A requests the PCI bus for the first time it is given its original priority. The device retains this original priority for N more PCI bus cycles. Thereafter it converts to the interim low priority state where it is given the lowest priority until a lower priority device is granted the bus. After one of the lower priority devices is granted ownership, the interim low priority device reverts back to its original priority. Thus, arbitration process 500 avoids starvation of lower priority devices due to the fact that a high priority device is allocated PCI bus ownership for a maximum of N PCI bus cycles (e.g., where a PCI bus cycle is defined as the period of time between the assertion of FRAME# to the deasserted of FRAME# and IRDY#). After N PCI bus cycles the high priority device transfers to the interim low priority state and another device is granted ownership.

It should be appreciated that there are a variety of arbitration priority schemes that could be utilized in the present invention. For example, the serial rotational priority arbitration scheme could be implemented in level A, and PCI Device 5 of level A could be equivalent to the highest ranking device of level B, in which level B could be a traditional fixed priority arbitration scheme of FIG. 1. In another example level A could comprise a traditional fixed priority arbitration scheme and level B could comprises an intermittent rotational priority arbitration scheme.

Figure 6:
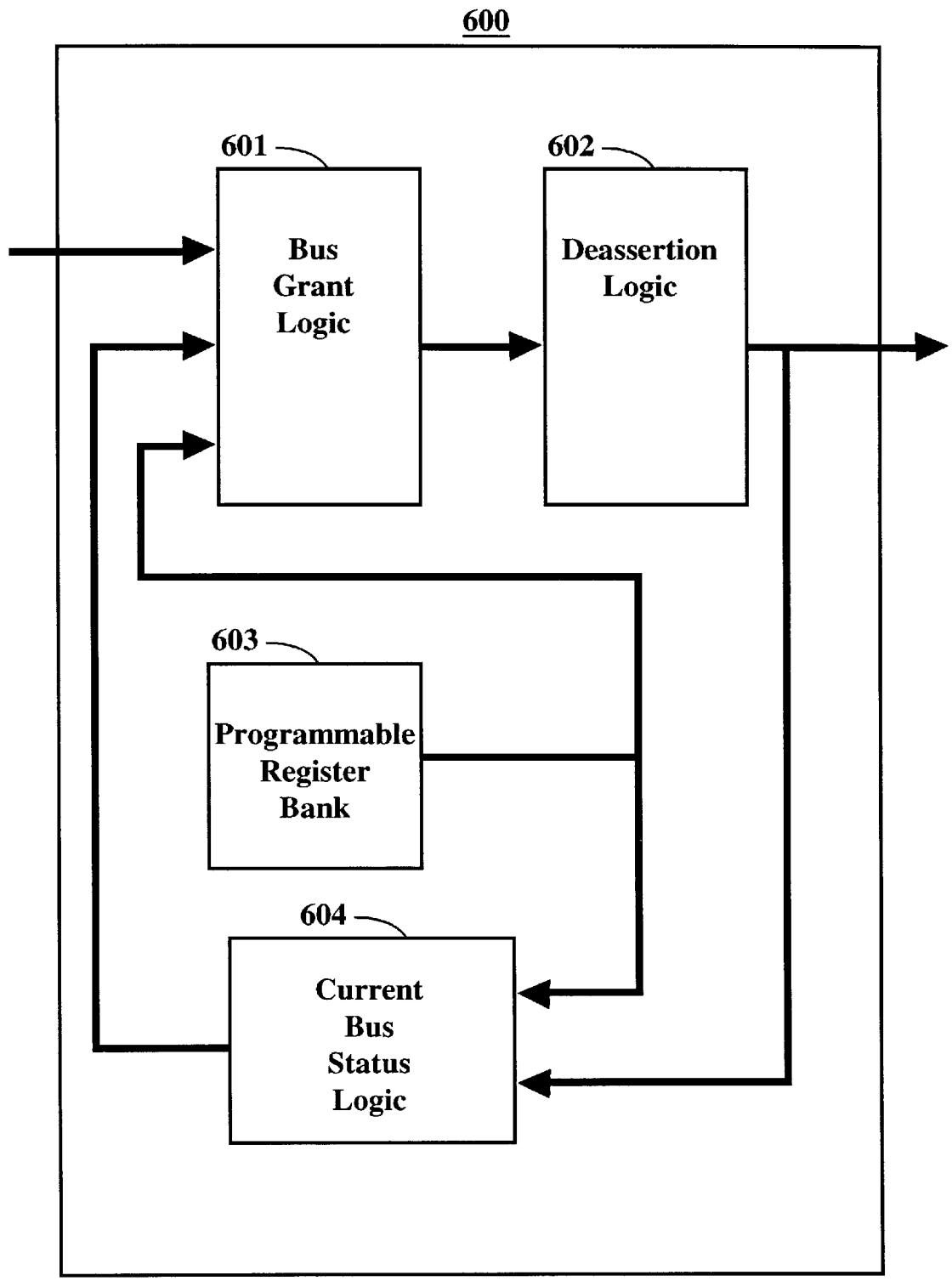
FIG. 6 is a schematic representation of the major components of System 600, one embodiment of the present invention.

FIG. 6 shows system 600. System 600 is an overview of the major components of one embodiment of the present invention. System 600 comprises a first, second, third and forth logic component. The first logic component comprises bus grant logic 601 for implementing a level A arbitration priority scheme, a level B arbitration priority scheme, and a level C arbitration priority scheme. A second logic component comprises deassertion logic 602 adapted to deassert a bus grant if bus grant logic 601 is attempting to switch bus grants while an internal PCI bus is idle. A third logic component comprises a programmable register bank 603 that permits arbitration priority schemes implemented by bus grant logic 601 to be programmed. A forth logic component comprises a current bus status logic 604 that keeps track of PCI bus access grants for a period of time. The bus grant logic 601 is coupled to the deassertion logic 602, the programmable register bank 603 and the current bus status logic 604. The programmable register bank 603 is coupled to the bus grant logic 601 and the current bus status logic 604.

Figure 7:
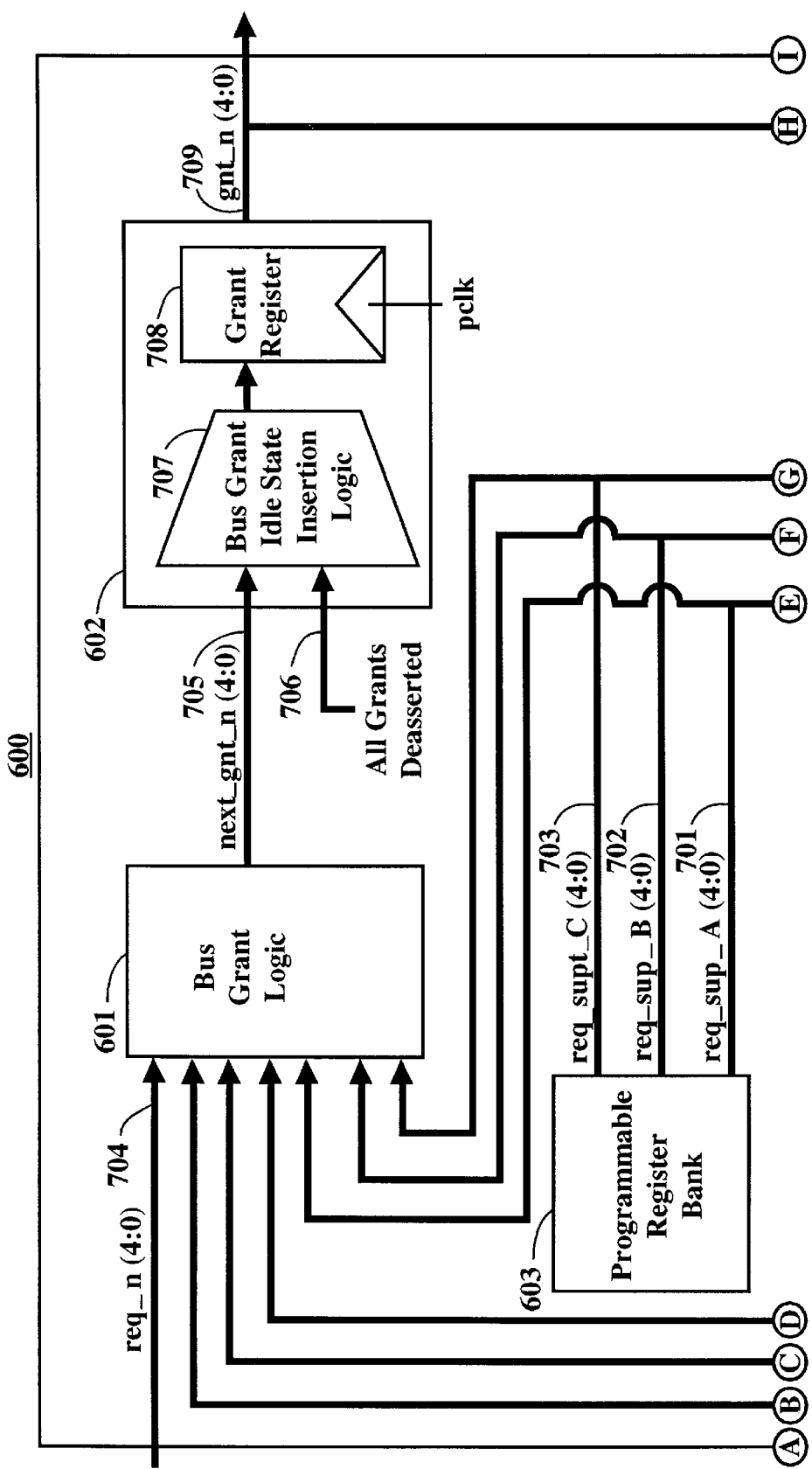
FIG. 7 is a schematic diagram illustrating expanded details of the major component of System 600 associated with one embodiment of the present invention.
Figure 7:
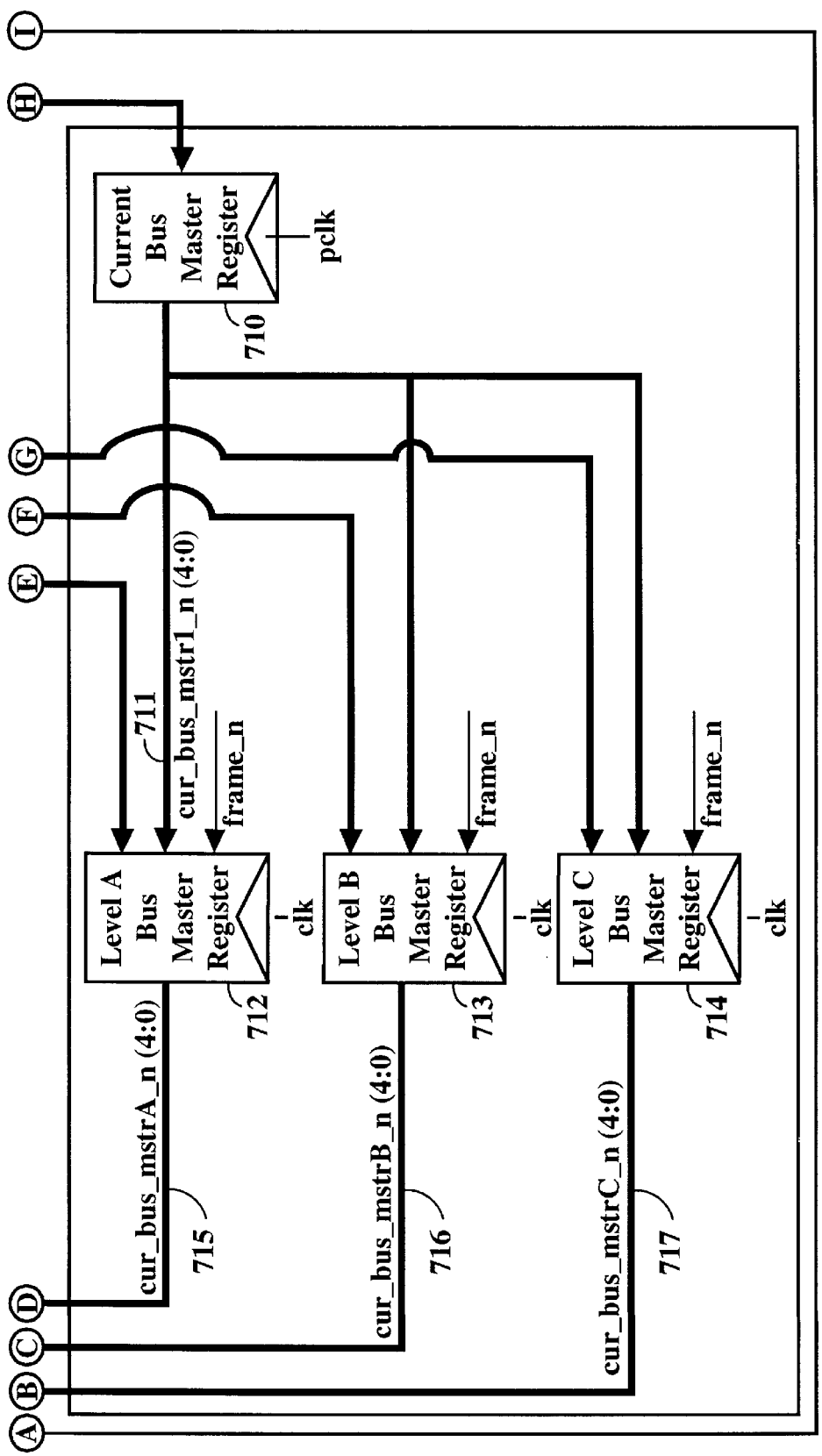

FIG. 7 shows more details of system 600. Programmable register bank 603 is used to program the assignment of devices to priority position holders. The programmable register bank 603 is programmed such that each device in a computer system is assigned a priority position holder in an arbitration priority scheme level. The outputs of the programmable register bank indicate which devices are supported in which arbitration priority level. The programmable register bank 603 outputs, req_sup_A (4:0) on line 701, req_sup_B (4:0) on line 702 and req_sup_C (4:0) on line 703, are coupled to bus grant logic 601.

Bus grant logic 601 implements an arbitration priority scheme. In the present embodiment, the arbitration priority scheme comprises a predictable latency guaranteed access fixed priority arbitration priority scheme level A, a serial rotational priority arbitration scheme level B and an intermittent rotational priority arbitration scheme level C. The bus grant logic 601 output, next_gnt_n (4:0) delivered on line705, and all grants deassert signal delivered on line 706 are coupled to deassertion logic 602.

In the present embodiment deassertion logic 602 comprises bus grant idle state insertion logic 707 and grant register 708. Bus grant idle state insertion logic 707 comprises a multiplexer. The output of the bus grant idle state insertion logic on line 707 is delivered to grant register 708. The grant register 708 latches grant information on every clock pulse. The grant register 708 is needed so that bus grant idle state insertion logic 707 can determine when to deassert the bus grants. The grant register 708 may also be needed for timing reasons depending on the complexity of the path from request inputs req_n (4:0) on line 704 to grant outputs gnt_n (4:0) on line 709. The output of the grant register 708 serves as the actual bus grant and is coupled to the devices in the computer system by gnt_n (4:0) signal on line 709.

Line 709 delivering bus grant output gnt_n (4:0) is also coupled to current bus master register 710. In the present embodiment current bus master register 710 latches the bus grant register outputs on every clock. The current bus master register 710 output, cur_bus_mstr1_n of signal line 711, is delivered to level A bus master register 712, level B bus master register 713, and level C bus master register 714 (collectively referred to as the level bus master registers). The level bus master registers track which device is engaged in a transaction on the PCI bus. The output signals of the level bus master registers, cur_bus_mstrA_n (4:0) on line 715, cur_bus_mstrB_n (4:0) on line 716, cur_bus_mstrC_n (4:0) on line 717, are coupled to bus grant logic 601. Bus grant logic 601 uses this information to determine when preemption of a priority position holder is appropriate. Bus grant logic 601 also uses this information to keep track of information on the last PCI bus access of devices in the computer system.

Figure 8:
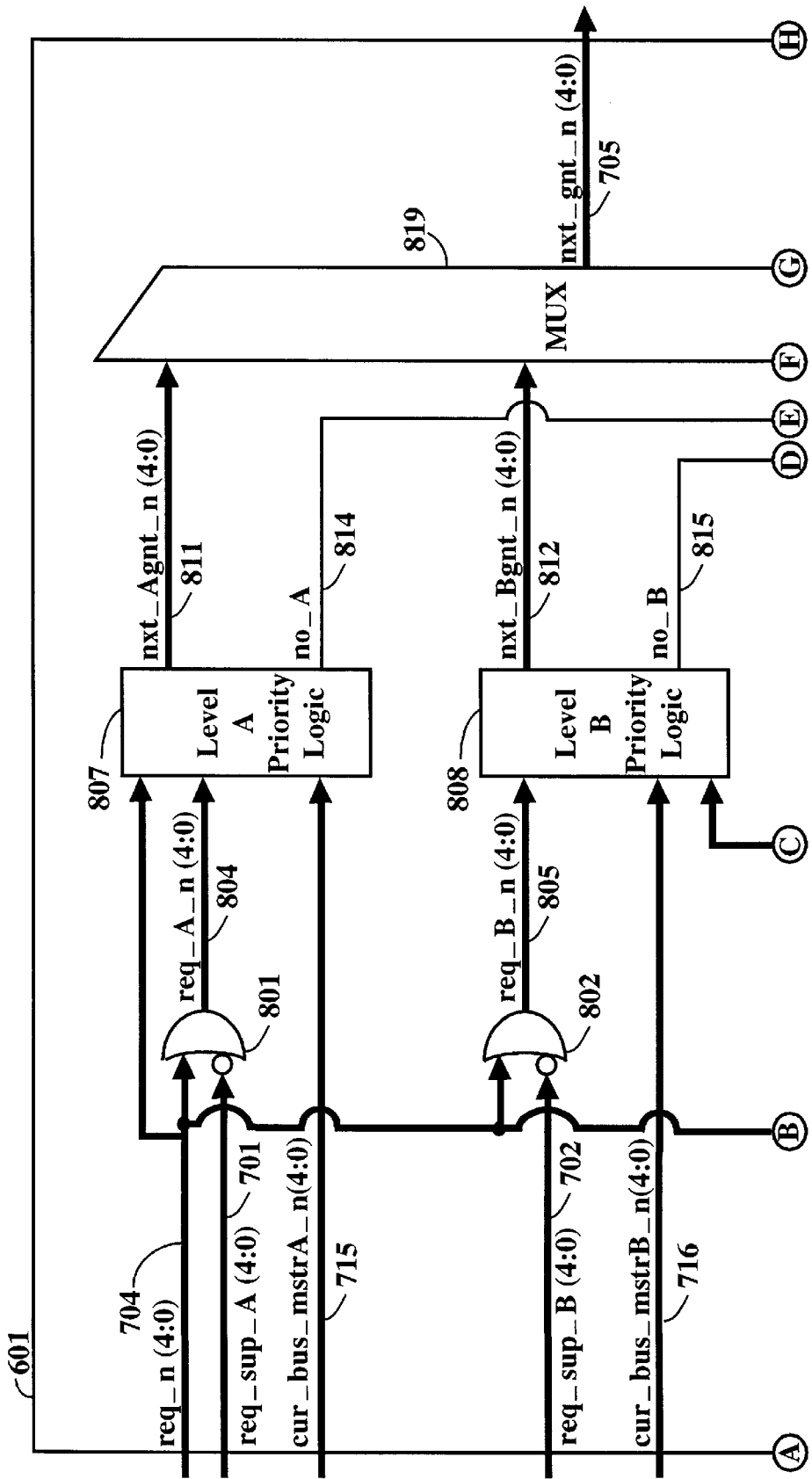
FIG. 8 is a schematic diagram depicting more specific logic components that comprise bus grant logic 601 in accordance with one embodiment of the present invention.
Figure 8:
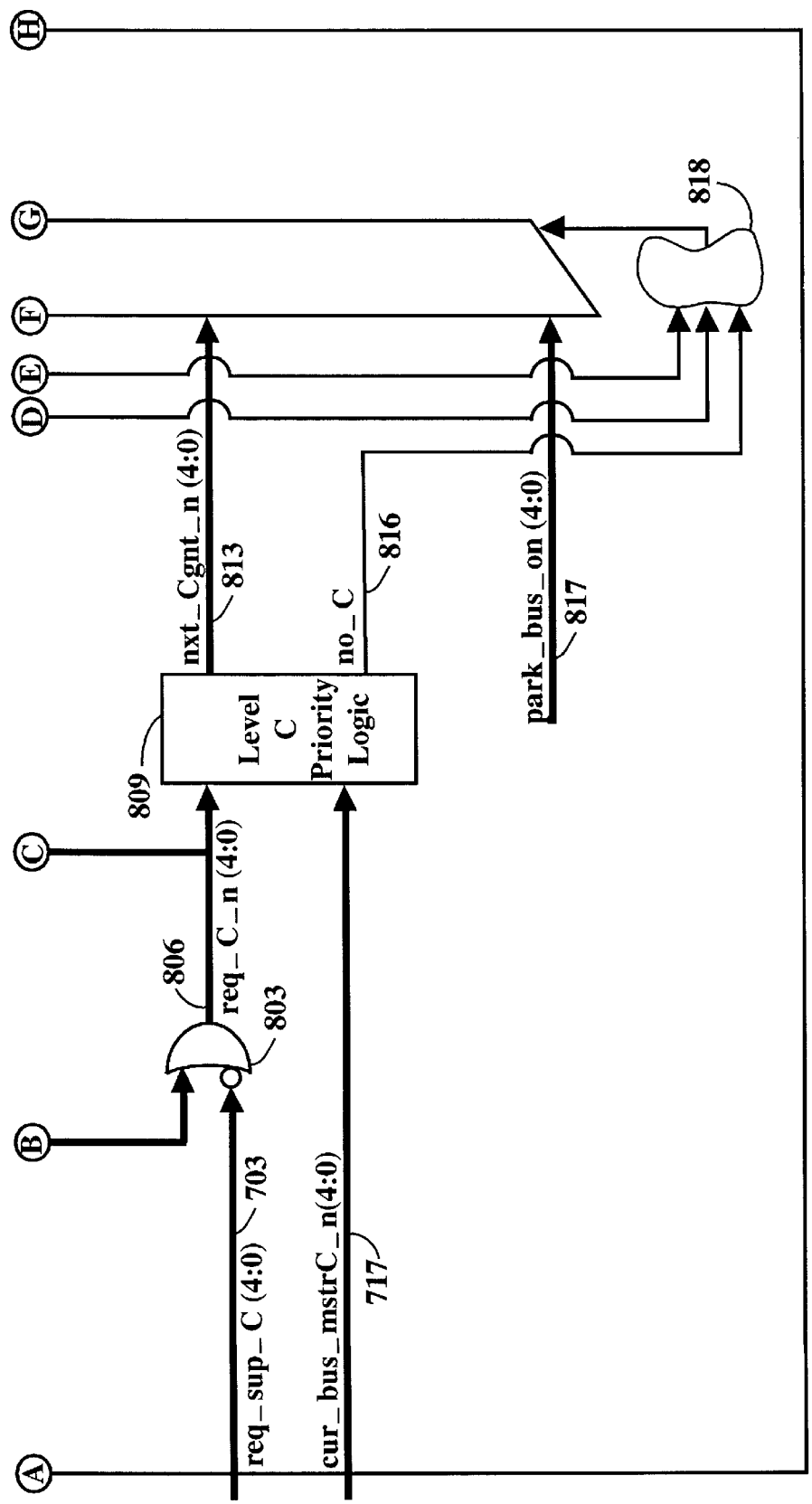

FIG. 8 depicts more details of bus grant logic 601. In the present embodiment, bus grant logic 601 comprises a plurality of arbitration priority scheme logic components. The arbitration priority scheme logic components implement various levels of arbitration priority schemes. Bus grant logic 601 also includes a plurality of level control logic components to determine which level contains a position holder assigned to a device requesting the PCI bus. Bus grant logic 601 further includes a selection logic component to select which arbitration priority scheme level output will determine the PCI bus grant. The plurality of arbitration priority scheme logic components that implement various levels of arbitration priority schemes comprise level A priority logic component 807, level B priority logic component 808, and level C priority logic component 809. The level control logic component that determines which level contains a position holder assigned to a device requesting the PCI bus comprises OR gates 801, 802, and 803. The selection logic component that selects which level of arbitration priority scheme's output will determine the PCI bus grant comprises a mutliplexer 819 and combinational logic 818.

Level A priority logic component 807 implements a predictable latency guaranteed access fixed priority arbitration scheme. The predictable latency guaranteed access fixed priority arbitration logic either needs to "look" at the raw PCI bus requests or at the request inputs for each of the lower arbitration priority schemes to determine if any requests are being asserted from lower priority devices in a lower priority level. In the present embodiment level A priority logic component 807 is coupled to line 704 delivering signal req_n (4:0) and looks at the raw PCI bus requests. Level B priority logic component 808 implements a serial rotational priority arbitration scheme. The serial rotational priority arbitration logic needs to look at the request input for level C priority logic component 809 to determine when one of the devices assigned to a position holder in Level C arbitration priority scheme is requesting the bus. Level C priority logic component 809 implements an intermittent rotational priority arbitration scheme.

Each level of arbitration priority schemes has a set of OR gates represented by the OR gate symbols 801, 802, and 803, all of which are coupled to req_n (4:0) signal on line 704. Request bus signal line 704 transmits request signals for PCI bus access from PCI initiator agents and the request signals on line 704 are asserted low (logical 0). OR gate 801 is also coupled to receive signal req_sup_A (4:0) on line 804, which transmits signals identifying the devices that have been assigned a position holder in level A. OR gate set 802 is also coupled to receive signal req_sup_B (4:0) on line 805, which transmits signals identifying the devices that have been assigned a position holder in level B. OR gate set 803 is also coupled to receive signal req_sup_C (4:0) on line 806. Line 806 transmits signals identifying the devices that have been assigned a position holder in level C. The signal req_n (4:0) is asserted low (logical 0) in this embodiment to request the PCI bus. Signals req_sup_A (4:0), req_sup_B (4:0), and req_sup_C (4:0) are asserted high (logical 1) in this embodiment to indicate a device is respectively in level A, level B or level C priority scheme.

Requests are processed through an OR gate to the appropriate level arbitration priority scheme when the OR gate inputs req_n (4:0) bit is low (logical 0) and a signal bit from the programmable register bank 603 is high (logical 1). Thus, if a req_n (4:0) signal on line 704 is asserted low (logical 0) and a req_sup_A (4:0) signal on line 701 bit is asserted high (logical 1) at an OR gate the request will proceed through to level A arbitration priority scheme. If a req_n (4:0) signal on line 704 is asserted low (logical 0) and a req_sup_B (4:0) signal on line 702 bit is asserted high (logical 1) at an OR gate the request will proceed through to level B arbitration priority scheme. If a req_n (4:0) bit is asserted low (logical 0) and a req_sup_C (4:0) on line 703 bit is asserted high (logical 1) at an OR gate the request will proceed through to level C arbitration priority scheme.

Each level priority logic component generates its own PCI bus grant and denial signal. The denial signal is sent to output mux 819 and if asserted, indicates there are no devices from an arbitration priority scheme which should be granted the PCI bus. Level A priority logic component 807 transmits PCI bus grant output signal nxt_Agnt_n (4:0) on line 811 and a denial signal no_A on line 814, both of which are coupled to mux 819. Level B priority logic component 808 transmits PCI bus grant output signals nxt_Bgnt_n (4:0) on line 812 and a denial signal no_B on line 815, both of which are coupled to mux 819. Level C priority logic component 809 transmits PCI bus grant output signal nxt_Cgnt_n (4:0) on line 813 and a denial signal no_C on line 816, both of which are coupled to mux 819. Mux 819 is also coupled to line 817 that carries signal park_bus_on (4:0). Signal park_bus_on (4:0) indicates which device the PCI bus access should be parked on when no devices are actively pursuing PCI bus access. After the arbitration priority scheme levels complete their arbitration processing Mux 819 selects which arbitration priority scheme level output will function as the PCI bus grant access.

For example, level A priority logic component 807 generates its own bus grant outputs nxt_Agnt_n(4:0) on line 811 and denial signal no_A on line 814. Denial signals no_A on line 814, no_B on line 815 and no_C on line 816 are coupled to combinational logic 818. The denial signals are processed though combinational logic 818 and indicate to the bus when to ignore the outputs of a level priority logic component. In this case if denial signal no_A is asserted, mux 819 will not process the information from level A logic component 807 as the next PCI bus access grant signal. If denial signal no_A is not asserted, mux 819 will process the information from level A logic component 807 as the next PCI bus access grant signal. Mux 819 is coupled to line 705 which carries the next grant signal, next_gnt_n (4:0), from mux 819 to deassertion logic 602. One skilled in the art will recognize that there are multiple means and methods of accomplishing other embodiments.

Figure 9:
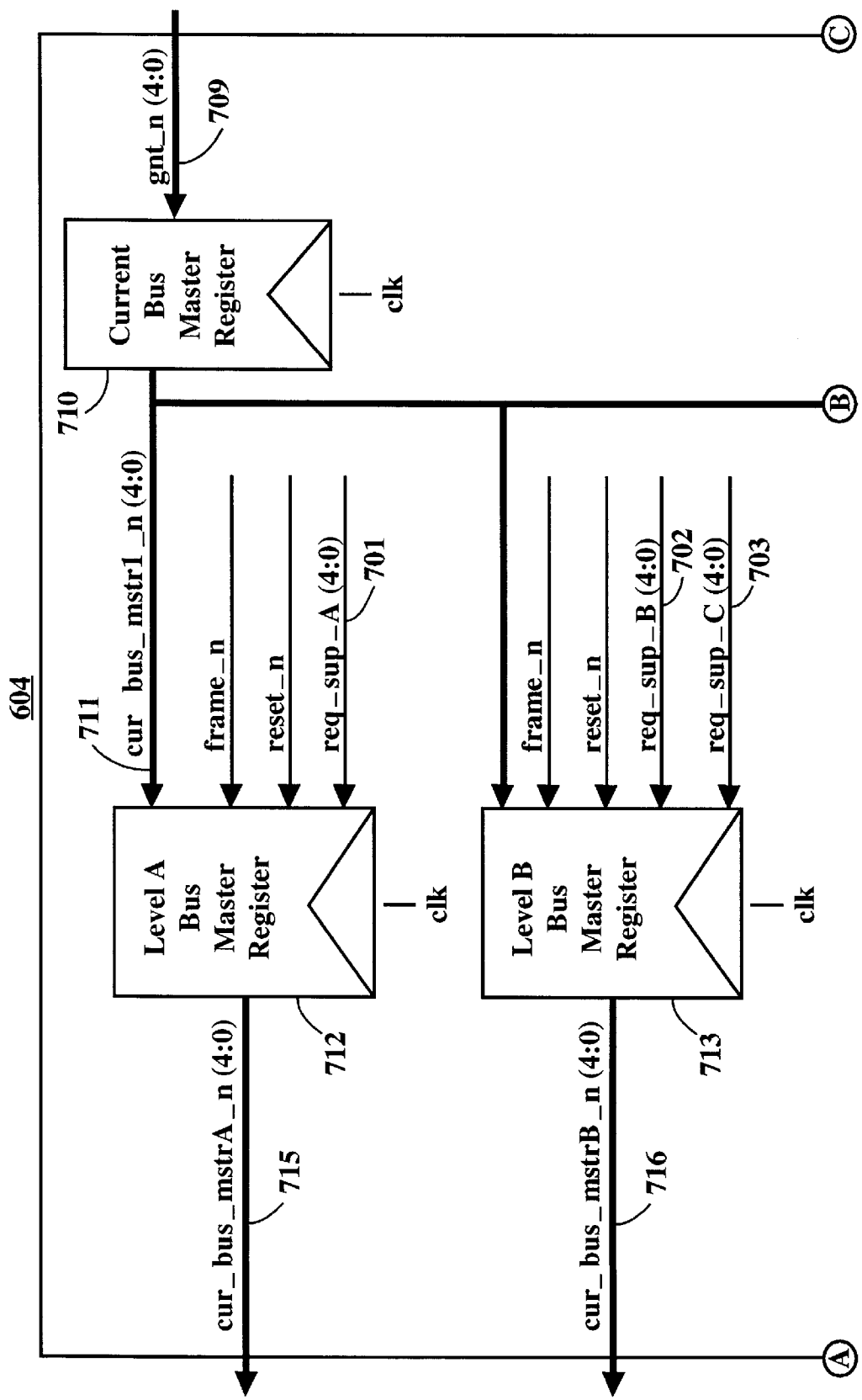
FIG. 9 is a schematic diagram portraying increased itemized implementation items of logic component current bus status logic 604 schemes in accordance with one embodiment of the present invention.
Figure 9:
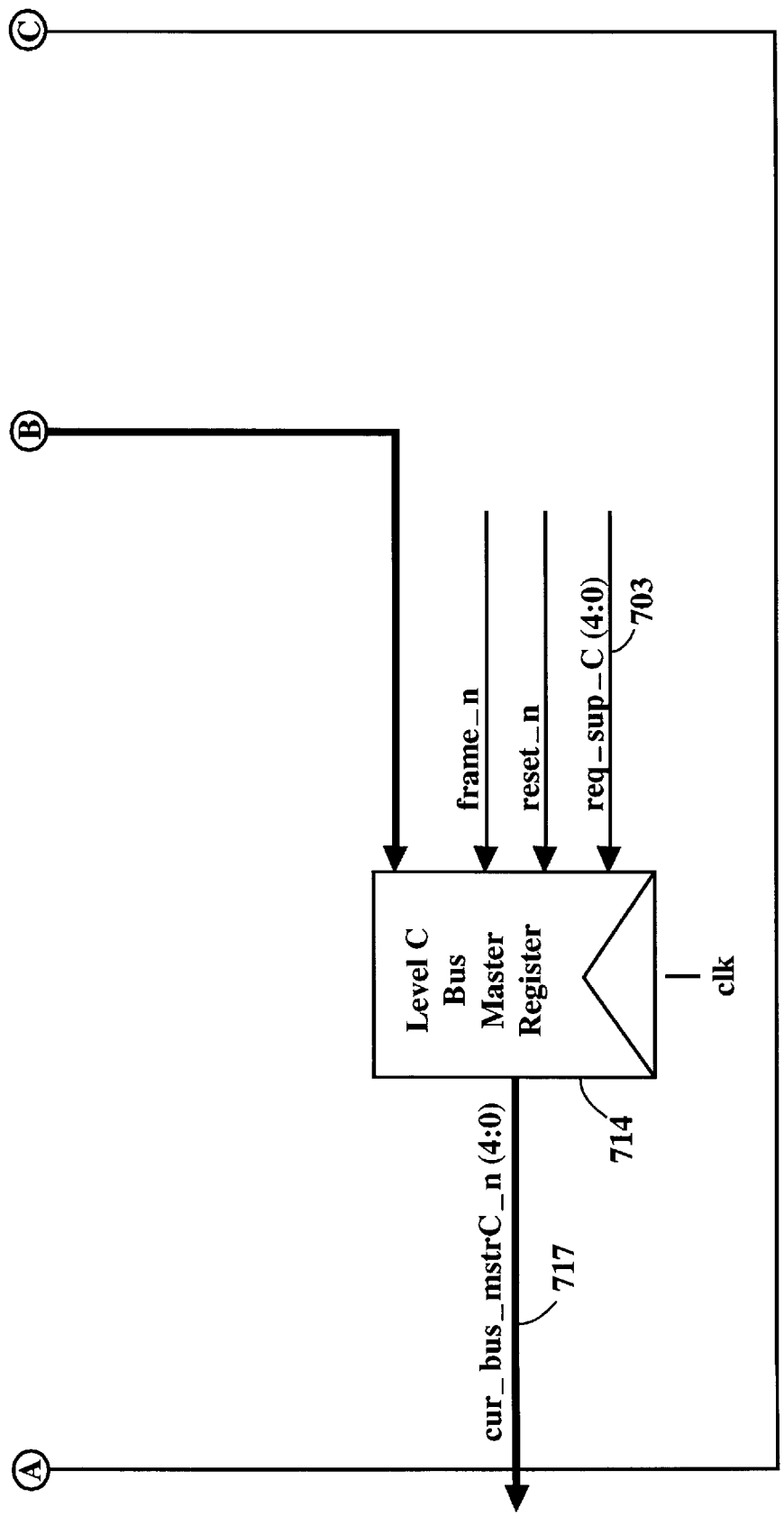

FIG. 9 shows more of the implementation details of logic component current bus status logic 604. As previously indicated current bus master register 710 is coupled to line 709 and latches bus grant information via signal gnt_n (4:0) each clock cycle. The current bus master register 710 is coupled to level A bus master register 712, level B bus master register 713 and level C bus master register 714 (the level bus master registers) by cur_bus_mstr1_n (4:0) signal on line 711. The level bus master registers latch information from current bus master 710 on a bit by bit basis when frame_n is asserted. The current bus master is needed to hold the bus grant information for one clock so that the level bus master registers latch the current device engaged in a transaction on the PCI bus when frame_n is asserted. Bus grants can change the clock pulse in which frame_n is asserted. Thus, without the current bus master register, it is possible the next bus grant would erroneously be latched instead of current bus grant.

Level A bus master register 712 only latches grant information corresponding to supported devices assigned priority position holders in level A's low latency guaranteed access fixed priority arbitration scheme. Level B bus master register 713 only latches grant information corresponding to supported devices assigned to priority position holders in level B's serial rotational priority arbitration scheme. Level C bus master register 714 only latches grant information corresponding to supported devices assigned to priority position holders in level C's intermittent rotational priority arbitration scheme. A low bit (logical 0) is latched in a level bus master register when frame_n is asserted to start a PCI cycle if a PCI initiator agent, assigned to priority position holder in a corresponding level, is granted the PCI bus. For example, bit 2 is latched low (logical 0) when a PCI initiator agent corresponding to bit 2 is granted the PCI bus.

In level A bus master register 712, a latched low bit (logical 0) will remain low until frame_n is deasserted and asserted again to start a new PCI cycle and a lower priority device is granted the bus, then the bit is latched high (logical 1). In the present embodiment level A 301 of FIG. 3 is a predictable latency guaranteed access fixed priority arbitration scheme. Level A priority logic component 807 of FIG. 8 can use the information latched in level A bus master register 712 of FIG. 7 to determine what priority should be given to each device. For example, in the present embodiment if level A bus master register's 712 bit 3 is high (logical 1) then the level A priority logic component 807 will process requests from the corresponding device 3 in accordance with its original priority position holder. If the current level A bus master register bit 3 is low (logical 0) then level A priority logic component 807 will process requests from device 3 in accordance with its interim low priority position holder.

In level B bus master register 713 of FIG. 7, a latched low bit (logical 0) will remain low until a new PCI bus cycle is started, then the bit is latched high (logical 1). As indicated above, a bit in level B bus master register 713 latches the current bus master register output if a PCI initiator agent assigned to priority position holder in level B 302 is granted the PCI bus. However, the level B 302 of FIG. 3 is a serial rotational priority arbitration scheme and includes a priority position holder for the highest priority device from level C 303 of FIG. 3, an intermittent rotational priority arbitration scheme. Thus, the level B bus master register 713 must also latch PCI bus grant information if a device assigned to a priority position holder in level C 303. Level B bus master register 713 uses the req_sup_C (4:0) signal on line 703 configuration bits to determine if a device from level C 303 has accessed the PCI bus. The level B bus master register 713 should latch all bus grants as being deasserted to signify that a device assigned to a priority position holder of level C 303 has been accessed the PCI bus. Bus grant logic 601 of FIG. 6 will then use this information in determining the next bus grant output.

In level C bus master register 714 of FIG. 7, a latched low bit (logical 0) will remain low until frame_n is deasserted and asserted again to start a new PCI cycle, then the bit is latched high (logical 1). In the present embodiment, level C bus master register 714 stores level C intermittent rotational priority arbitration scheme information. Thus, after each time a device assigned to a priority position in level C intermittent rotational priority arbitration scheme is granted the PCI bus the priority returns to level B.

Figure 10:
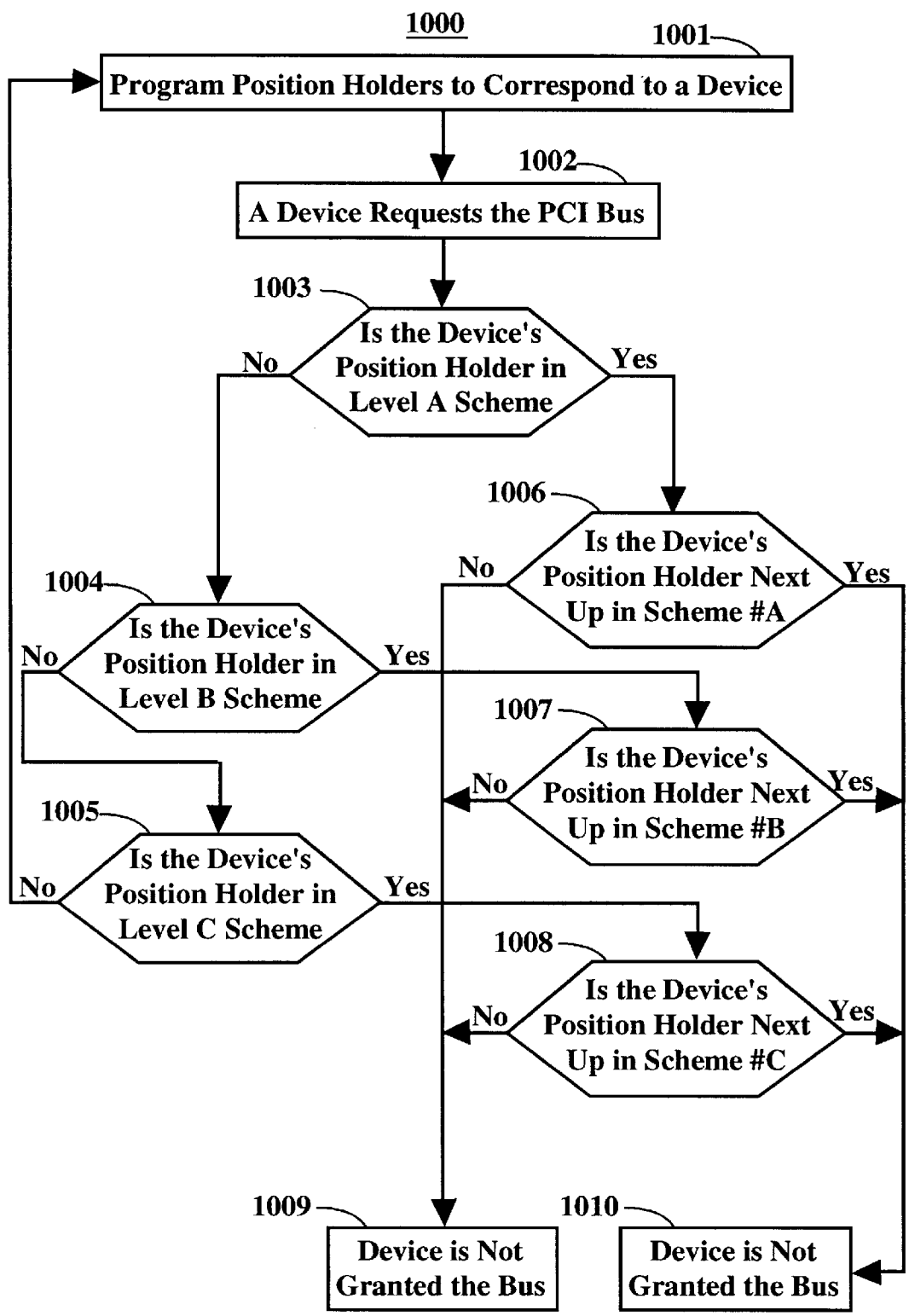
FIG. 10 is a flow chart illustrating steps associated with a process 1000 in accordance with one embodiment of the present claimed invention.

Referring now to FIG. 10, a flow chart 1000 illustrating process steps associated with one embodiment of the present invention is shown. The process of the present embodiment begins with step 1001, in which devices are programmed to correspond to priority position holders in an arbitration priority scheme. This is accomplished by programming register bank 603 of FIG. 6.

In step 1002, a device in the computer system requests PCI bus access. The request is initiated by following typical PCI bus procedures. More specifically, a PCI target agent asserts a bus request signal, req_n (4:0), on line 704 of FIG. 7.

In step 1003, the reconfigurable priority arbitration system of the present embodiment determines if the device requesting access to the PCI bus has been assigned a priority position holder in level A arbitration priority scheme. The present embodiment makes this determination by analyzing the output, req_sup_A (4:0), from programmable register bank 603 on line 701 of FIG. 7 and the request signal req_n (4:0) on line 704. Both signals are coupled to an OR gate and the analysis is performed by the OR gate. If the signal req_n (4:0) on line 704 is asserted low (logical 0) and a signal req_sup_A (4:0) on line 701 is asserted high (logical 1), the device requesting the PCI bus is assigned to a priority position holder in level A's arbitration priority scheme. If the device is not assigned to a priority position holder in level A's arbitration priority scheme the present embodiment tries to determine which level contains the priority position holder to which the device has been assigned.

In step 1004, the reconfigurable priority arbitration system of the present embodiment determines if the device requesting access to the PCI bus has been assigned a priority position holder in level B arbitration priority scheme. The present embodiment makes this determination utilizing the level B logic components described above following a process similar to that described in step 1003. If the device is not assigned to a priority position holder in level B's arbitration priority scheme the present embodiment tries to determine which level contains the priority position holder to which the device has been assigned.

In step 1005, the reconfigurable priority arbitration system of the present embodiment determines if the device requesting access to the PCI bus has been assigned a priority position holder in the level C arbitration priority scheme. The present embodiment makes this determination utilizing the level C logic components described above following a process similar to that described in step 1003. If the device is not assigned to a priority position holder in level C's arbitration priority scheme, the process returns to Step 1001 to assign a priority position holder to the device. If the device is not assigned a priority position holder it cannot be granted the bus.

In step 1006, the present embodiment determines if the device's position holder was in a level A priority scheme at step 1003 and is next in line to be granted PCI bus access. If a device is assigned to a priority position holder next in line to be granted PCI bus access, the process proceeds to step 1010. If a device is not assigned to a priority position holder next in line to be granted PCI bus access, the process proceeds to step 1009.

In step 1007, the present embodiment determines if the device's position holder was in a level B priority scheme at step 1004 is next in line to be granted PCI bus access. If a device is assigned to a priority position holder next in line to be granted PCI bus access, the process proceeds to step 1010. If a device is not assigned to a priority position holder next in line to be granted PCS bus access, the process proceeds to step 1009.

In step 1008, the present embodiment determines if the device's position holder was in a level C priority scheme at step 1005 next in line to be granted PCI bus access. If a device is assigned to a priority position holder next in line to be granted PCI bus access, the process proceeds to step 1010. If a device is not assigned to a priority position holder next in line to be granted PCI bus access, the process proceeds to step 1009.

In step 1009 of the present embodiment, if the device has not been assigned to a priority position holder that is next in line to be granted PCI bus access, the device is not granted PCI bus access.

In step 1010 of the present embodiment, if the device has been assigned to a priority position holder that is next in line to be granted PCI bus access, the device is granted PCI bus access.

The present embodiment is a method and system of bus arbitration that provides for a reconfigurable arbitration priority system with flexible reprogrammable arbitration priority schemes. The present embodiment efficiently allocates PCI bus bandwidth to optimize the overall functionality of a computer system. The reconfigurable priority arbitration system of the present embodiment is capable of adapting to changes in device requirements and addressing complex priority allocation parameters. The present embodiment provides methods of ensuring devices with stringent requirements that demand significant PCI bus bandwidth are assigned a relatively high priority and properly served, while providing low priority devices with sufficient bus access time to guarantee they are not "starved". The present embodiment allows a programmable and highly reconfigurable priority arbitration system to implementation of a multiple arbitration priority schemes in a variety of computer systems.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A flexible bus arbitration system for a PCI (peripheral component interconnect) bus system, comprising:

a PCI bus;

a PCI initiator agent coupled to said PCI bus, said PCI initiator agent adapted to communicate via said PCI bus;

a PCI target agent coupled to said PCI bus, said PCI target agent adapted to communicate via said PCI bus;

a PCI arbiter coupled to said PCI bus, said PCI arbiter adapted to communicate via said PCI bus;

a reconfigurable priority arbitration system coupled to said PCI bus, wherein said reconfigurable priority arbitration system adapted to receive reprogrammable priorities, said reconfigurable priority arbitration system further adapted to control access to said PCI bus;

a first logic component coupled to said PCI bus, said first logic component for implementing said arbitration priority scheme; and a second logic component coupled to said first logic component, said second logic component adapted to deassert a bus grant if said first logic component is attempting to switch a bus grant while said PCI bus is idle.

2. The flexible arbitration system of claim 1 wherein said reconfigurable priority arbitration system is further adapted to implement an arbitration priority scheme, said arbitration priority scheme including a plurality of priority position holders, wherein each of said plurality of priority position holders represents a rank of relative priority for accessing said PCI bus.

3. The flexible arbitration system of claim 2 wherein said PCI initiator agent is adapted to correspond to one of said plurality of priority position holders in said arbitration priority scheme, and wherein said PCI initiator agent's relative priority to access said PCI bus corresponds to said one priority position holder.

4. The flexible bus arbitration system of claim 3, wherein said arbitration priority scheme comprises a plurality of linked arbitration priority scheme levels.

5. The flexible bus arbitration system of claim 3, wherein said arbitration priority scheme further comprises a low latency guaranteed access fixed priority level.

6. The flexible bus arbitration system of claim 5, wherein said arbitration priority scheme further comprises:

a fixed priority logic level;

a serial rotational priority logic level; and an intermittent rotational priority logic level.

7. The flexible bus arbitration system of claim 1 wherein said first logic component further comprises:

an arbitration priority scheme logic component coupled to a current bus status signal line, said arbitration priority scheme logic component adapted to implement an arbitration scheme;

a level control logic component coupled to said arbitration priority scheme logic component, said level control logic component adapted to regulate PCI bus access requests to said arbitration scheme logic component; and a selection logic component coupled to said arbitration scheme logic component, said selection logic component adapted to select an output of said arbitration scheme logic component and process said output as a next bus grant.

8. The flexible bus arbitration system of claim 7, wherein said second logic component further comprises:

a multiplexer, said multiplexer adapted to process a second signal, said signal indicating the next said PCI initiator to be granted said PCI bus access.

9. The flexible bus arbitration system of claim 8, further comprising:

a third logic component coupled to said first logic component, said third logic component adapted to permit programming of said first logic component.

10. The flexible bus arbitration scheme of claim 9, wherein said third logic component comprises a register bank.

11. The flexible bus arbitration system of claim 10, further comprising:

a fourth logic component coupled to said first logic component, said fourth logic component adapted to keep track of a priority status of said PCI bus accesses.

12. The flexible bus arbitration system of claim 11, wherein said fourth logic component further comprises:

a current bus master register coupled to a PCI bus access grant signal, said current bus master register adapted to maintain status of PCI bus access grants for a period of time; and a plurality of level bus master registers coupled to said current bus master register, said level bus master registers corresponding to an arbitration priority scheme level.

13. In a computer system including a bus, a master device, a slave device, an arbiter, and an arbitration system, a flexible bus arbitration process comprising the steps of:

a) establishing an arbitration priority scheme including the steps of:

establishing a low latency guaranteed access fixed arbitration priority scheme;

granting ownership of said bus to a first master device;

converting said first master device to an interim low priority state such that an original priority position holder corresponding to a second master device is a higher priority than said first master device's interim low priority state; and reverting said first master device to an original priority state after granting said second master device bus access, said first master device's original priority state being a higher priority that said second master device's original priority state;

b) programming devices to correspond to priority position holders in said arbitration priority scheme;

c) receiving a request for ownership of a bus from a first master device coupled to said bus;

d) receiving a request for ownership of said bus from a second master device coupled to said bus;

e) determining if said first master device or said second master device corresponds to a priority position holder that is next in said arbitration priority scheme to be granted bus access;

f) denying ownership of said bus to said second master device, wherein said second master device corresponds to a priority position holder that is not next in said arbitration priority scheme to be granted access to said bus; and g) granting ownership of said bus to said first master device, wherein said first master device corresponds to a priority position holder that is next in said arbitration priority scheme to be granted access to said bus.

14. The process of claim 13, wherein step a) further includes the step of:

a1) establishing a plurality of arbitration priority schemes.

15. The process of claim 14 further including the step of:

h) determining which arbitration priority scheme a priority position holder corresponding to a master device requesting bus access is in.

16. The process of claim 13 further including the step of:

f1) storing the status of said master device most recently engaged in a transaction on the bus.

17. The process of claim 13 wherein said steps a) through e) are implemented in a PCI (peripheral component interconnect) bus system.

* * * * *